UNITED STATES PATENT OFFICE.

FREDERICK H. L. C. SACC, OF NEUFCHATEL, SWITZERLAND.

IMPROVEMENT IN THE PRESERVATION OF MEATS.

Specification forming part of Letters Patent No. 169,592, dated November 2, 1875; application filed October 20, 1875.

CASE B.

*To all whom it may concern:*

Be it known that I, FREDERICK H. L. C. SACC, of Neufchatel, in the Swiss Republic, have invented certain new and useful Improvements in the Preservation of Meats, of which the following is a specification:

In the method of preparing meats for preservative purposes, by the means of acetate of soda, and for which an application for patent of even date herewith has been filed by me in the United States Patent Office, the meat necessitates to be regenerated for use by means of chlorhydrate of ammonia—a process which involves considerable delays and inconveniences, and which it is my present object to avoid—and I have accomplished the same by using a composition quite as energetic in its action as the one which is the subject-matter of the application for patent before referred to, but which has the great advantage of permitting of its removal or abstraction by simple washings with ordinary water.

The present invention is, therefore, based upon the use of a mixture consisting of alcohol used as an antiseptic, and of salt (ClNa) used as a dehydrating agent. These ingredients are used in the following proportions for every one hundred pounds of meat, viz: twenty-five pounds of common salt, (ClNa;) twenty-five pounds of alcohol at 90° centigrade; twenty-five pounds of fresh water. These proportions may be varied without materially affecting the result.

The *modus operandi* is as follows: I place in a vessel of glass, pottery, tinned iron, or other suitable receptacle, the meat proposed to be preserved, and fill the vessel with the mixture before stated.

The meat thus prepared will be found to preserve for an indefinite period of time.

I recommend that vessels made of wood be avoided, as they are apt to give a peculiar taste to the meat, which is, to some persons, disagreeable.

To use, for cooking purposes, meat thus preserved, it should be soaked for twenty-four hours in fresh water. The length of time the meat is allowed to remain in the water, however, is not essential, as it will often suffice to simply wash it once or twice.

The process of preservation by me described has given excellent results, and I deem it preferable to the use of any more complex composition or mixture, which, however, may be made without departure from my invention. Thus solid and liquid substances may be added to the composition, such as certain essences, glycerine, and various salts—for instance, certain chlorides, or nitrate of potassa, or acetate of soda, and other ingredients. The use of these additional ingredients will not, however, materially change the result which is obtained with the simple composition before given.

Having thus described my invention, and the manner in which the same is or may be carried into effect, I claim—

The method herein described of preserving butcher's meat, game, fish, mollusks, &c., by the employment of chloride of sodium, alcohol, and water, in combination, either alone or in connection with other ingredients, substantially as herein set forth.

In testimony whereof I have hereunto signed my name this 19th day of October, A. D. 1875.

SACC.

Witnesses:
 A. POLLOK,
 EWELL A. DICK.